INVENTORS
LEWIS O. STUDER
JOHN L. LANE
BY
Oldham & Oldham
ATTYS.

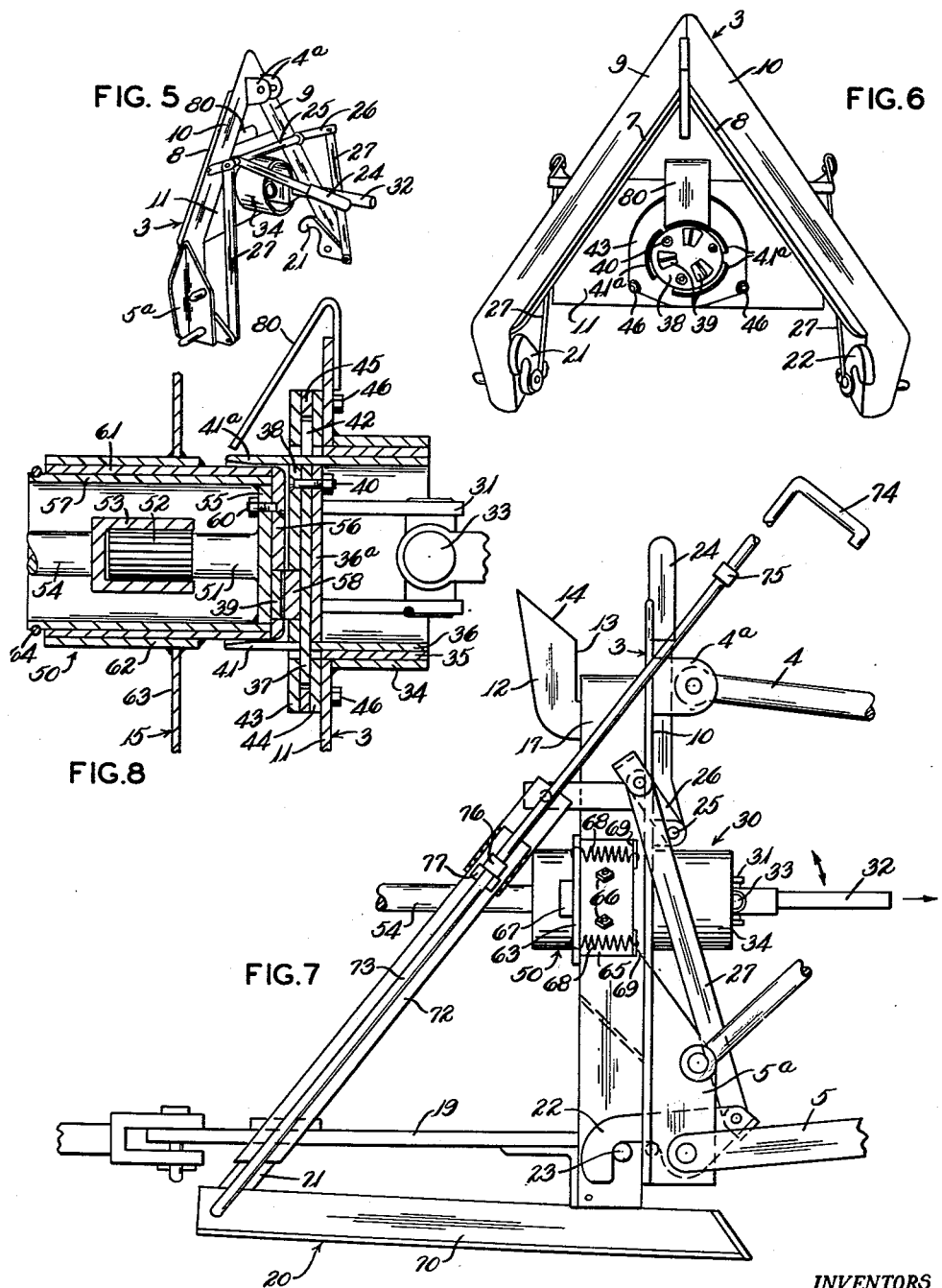

United States Patent Office 3,074,501
Patented Jan. 22, 1963

3,074,501
AUTOMATICALLY ENGAGEABLE POWER COUPLING MEANS FOR TRACTORS OR THE LIKE
John L. Lane, Warren, and Lewis O. Studer, Doylestown, Ohio; said Studer assignor to Weather-Seal, Inc., Barberton, Ohio, and said Lane assignor to Guy E. Lane, Youngstown, Ohio
Filed Feb. 28, 1961, Ser. No. 92,205
16 Claims. (Cl. 180—14)

The present invention relates to power couplings, especially to a power coupling or a power take-off between a tractor, for example, and an implement to be secured thereto and where inter-engaging, or nesting hitch means are provided on the tractor and implement for hitching action therebetween and where the power coupling means are automatically engaged substantially concurrently, or simultaneously with engagement of the hitching means on the tractor and implement.

In tractors and similar vehicles, it frequently is necessary to connect the conventional power take-off shaft of such vehicle with the power receiving shaft on an implement or other article to be coupled to the tractor so that means on the implement can receive power from the power supply shaft of the tractor. It obviously is desirable to couple the power transmitting means from the tractor to the implement with a minimum of operational difficulties and with the operator of the tractor or other power supply vehicle preferably not having to get off the tractor, or to have any other worker required to aid in the power coupling action. One previous endeavor to supply an automatic coupling action in the class of vehicles described is the structure shown in United States Patent No. 2,869,660.

Yet another problem involved in the supply of power to implements used with a tractor is that there must be some type of a hitch secured between the implement and tractor in most events in order to have the power transmitting action be properly and completely effected. The present power coupling assembly is adapted for use with hitch devices such as the Ford or Ferguson 3-point hitch, or the hitches of U.S. Patents Nos. 2,685,453 or 2,888,995, for example.

In such hitch device and in many tractors in use today, normally the tractor is provided with power operated means for lifting and lowering, or for tilting in a fore and aft direction, some member or means attached to the tractor, and the actual hitch means may comprise a first frame attachable to the implement and a second frame attachable to the power operated means on the tractor. These frames, which are adapted to be nested into, or abutted against each other, or to be brought into some type of engagement, or register, are normally disposed in a generally vertical plane transverse to the longitudinal center line of the tractor and implement combination. The frames are engageable with each other by some relative axial movement between the tractor and the implement usually combined with some tilting or vertical lifting movement of the frame attached to the tractor and controlled by the power operated means in order to lift or slip the tractor mounted frame into inter-engaged relationship with the frame member on the implement.

The general object of the present invention is to provide a novel and improved power transmitting coupling assembly including a member to be positioned on the tractor mounted hitch frame, and a companion coupling member to be mounted on the hitch frame affixed to the implement and characterized by the automatic engagement between these coupling members substantially concurrently with the coupling, or engagement of the hitch members.

Another object of the invention is to provide cooperating coupling members on a tractor and on an implement, or on other vehicles similar thereto, and where a controlled resilient positioning of one coupling member is provided to permit overrunning clutch engagement between the two coupling members, and to facilitate automatic coupling engagement therebetween.

A further object of the invention is to provide coupling members on vehicles and implements of the class described and where thrust bearing means are provided to position a power supply shaft on the tractor mounted hitch means, and to position a power receiving coupling assembly on the implement so that limited axial and other engaging movement of the means on the implement hitch unit can be provided.

Another object of the invention is to provide a guide member in association with the coupling members to aid in guiding the coupling members into proper association and alignment with each other concurrently with the action of the hitch members being brought into nested engagement.

Yet another object of the invention is to provide automatic coupling means on vehicles and implements of the class described and where such coupling means are made from a relatively few parts all of sturdy construction and are made from relatively inexpensive members adapted to have a maximum service life with a minimum of maintenance being required thereon.

The foregoing and other objects and advantages of the present invention will be made more apparent as the specification proceeds.

Attention now is particularly directed to the accompanying drawings, wherein:

FIG. 5 is a perspective view of the power take-off member of the invention for attachment to the tractor and shown from the tractor face thereof;

FIG. 6 is an elevation of the coupling member of FIG. 6 taken from the face thereof facing away from the tractor;

FIG. 7 is an enlarged side elevation of the power take-off means of the invention in assembled relationship and with a stand for the implement being provided and shown in retracted position;

FIG. 8 is a fragmentary enlarged verticle section taken through the power take-off means of the invention.

When referring to corresponding members shown in the drawings and referred to in the specification, corresponding numerals are used to facilitate comparison therebetween.

Figure 1:
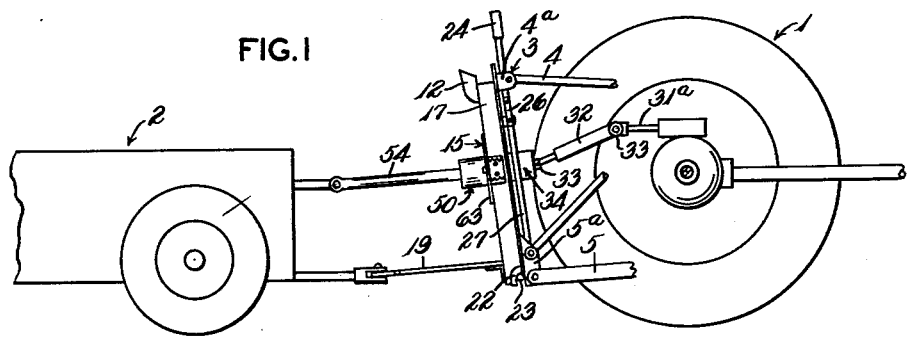
FIG. 1 is a side elevation of the tractor and implement secured together by members including power take-off means embodying the principles of the invention.

The power take-off, or coupling assembly of the invention is adapted for attachment to a tractor having power supply means for lifting and lowering a hitch member attached thereto, or for tilting such member in a fore and aft direction, a power supply shaft being present on the tractor, and with the power coupling assembly being engageable with an implement having a hitch member thereon and where the power coupling assembly includes the combination of a driving shaft connected to the power supply shaft on the tractor, means journalling the driving shaft in a fixed axial position on the hitch member on the tractor, a driven shaft adapted to be coupled to means on the implement for power supply thereto, means on the implement hitch member engaging and journalling the driven shaft therein, resilent means connecting and securing such driven shaft engaging means to the implement hitch member for limited movement relative thereto, interengaging means operatively carried by the driven shaft and by the driving shaft for power transmission therebetween, and which inter-engaging means is substantially simultaneously engaged when the hitch members on the tractor and implement are engaged by relative movement between the tractor and implement.

Attention now is directed to the details of the structure shown in the accompanying drawings, and a tractor is indicated as a whole by the numeral 1. This tractor is adapted to be engaged to a conventional farm implement 2 for moving such an implement, and for supplying power thereto, all as described hereinafter in more detail. As indicated hereinbefore, the actual hitch means between the tractor and the implement for connecting such members together readily and usually automatically to pull such implement by the tractor are not part of this invention and may take a variety of forms. Such means are shown as including a male hitch 3 adapted to be secured to the tractor by an arm 4 at the top of the male hitch and by a pair of arms 5, 5 which pivotally engage the lower, laterally spaced ends of the male hitch 3. These control arms 4 and 5 are connected to suitable members, such as conventional power operated control arms provided on many different styles of tractors as made and sold commercially for many years. The control arms 4 and 5 are adapted to raise and lower the male hitch 3, and to tilt such member in a fore and aft direction. The male hitch 3 includes two upwardly converging side portions 7 and 8 that may conveniently be formed as one leg of each of two angle members, as shown in the drawings, and with the other legs 9 and 10 of these angle members forming front or stop surfaces in the male hitch.

It will be noted that the converging side portions 7 and 8 in the male hitch provide load bearing surfaces in the hitch means with which the power coupling or take-off means of the invention can be associated. Such angle members may have any desired type of reenforcing means or plates associated therewith, as desired, and in this embodiment of the invention, a cross plate 11 is shown bolted, or otherwise secured to the converging side portions 7 and 8 and spaced downwardly vertically from the apex formed therebetween. Such cross plate 11 is used to secure the driving shaft in position for power supply action in the power take-off, or coupling of the invention.

It will be seen that the control arms 4 and 5 from the tractor may be secured to the male hitch 3 in any suitable manner and that a pair of ears 4a, 4a, FIG. 7, for example, are provided on, or suitably secured to the male hitch at the apex thereof for receiving a pin or similar member to connect the control arm 4 to the male hitch. Likewise, forwardly extending plates 5a may be secured to the side portions 7 and 8, or other parts of the male hitch 3 at the bottom ends thereof and extend towards the tractor 1 for convenient pivotal coupling engagement with the control arms 5 and 6 by connecting pins, or the like.

The male hitch 3 may be made in other shapes or forms from the particular inverted angles as shown, and may, for example, be made from a flat plate to the back of which are secured converging members in the form of straps or plates arranged to provide an inverted but upwardly converging load bearing surface like the support means 7 and 8 for use in the hitch.

The male hitch 3 also includes, as an important element thereof, a hook 12 that is rigidly fastened to the male hitch, as by welding it to the male hitch at the apex of the converging side portions 7 and 8 so that such hook 12 projects rearwardly of the tractor 1 from the other portions of the male hitch. The hook 12 is of such size and shape that it has a vertically upwardly extending edge 13 immediately adjacent the rear margins of the converging side portions 7 and 8 and with a rearwardly inclined edge 14 being formed on the hook 12 connecting to the vertically extending edge 13. The inclined edge 14 extends to the top of the hook 12 and aids in seating the female hitch member in desired hitched engagement with the male hitch member to connect the tractor and implement together and the inclined edge may be as long as is convenient or desirable. The proportions in the length of the vertically upwardly extending edge 13 in relation to the inclined edge 14 is shown in the drawings are adequate for use with tractors where three point hitch means are provided thereon as in such instance the male hitch member can be raised in a substantially vertical plane. For use with tractors having a fixed transverse drawbar, and where the male hitch can be tilted backwards on the drawbar but cannot be raised, it is generally desirable that the inclined portion of the hook 12 be longer.

Female Hitch

Figure 2:
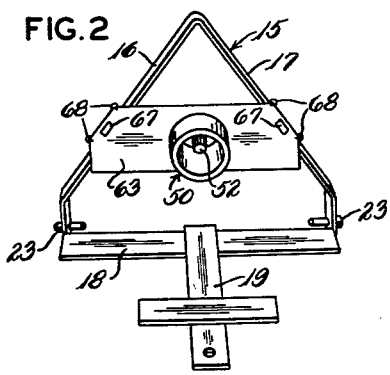
FIG. 2 is an elevation of the implement mounted portion of the power take-off and hitch member from the implement side thereof.
Figure 3:
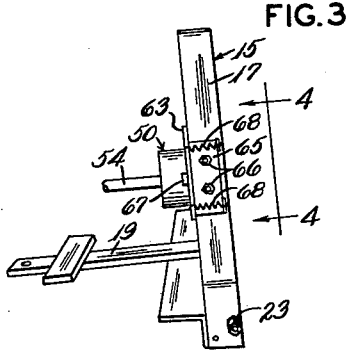
FIG. 3 is a side elevation of the implement mounted power take-off means of the invention.
Figure 4:
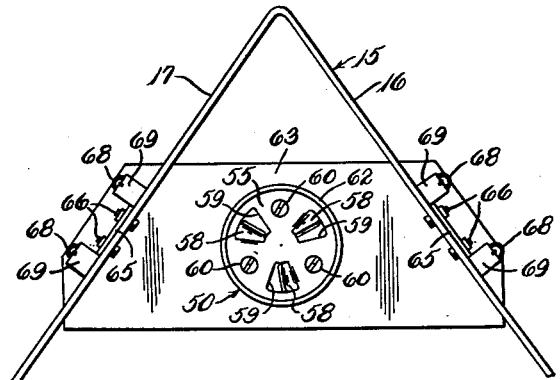
FIG. 4 is an elevation of the power take-off means of the invention taken on line 4—4 of FIG. 3.

The female hitch, which is designated as a whole by the numeral 15, is best shown in FIGS. 2 and 3 and primarily comprises a saddle member or unit comprising, for example, an inverted V-shaped metal bar or strap which has converging sides 16 and 17 formed thereon. The female hitch 15 may include a bottom cross plate 18 permanently secured, as by welding, to the lower ends of the converging sides 16 and 17, preferably at vertically extending, parallel portions thereof. Or, such bottom plate 18 may be a part of the drawbar connection on the implement 2 as in all instances the female hitch 15 is permanently secured to the implement. If the bottom plate 18 is formed as part of the female hitch 15, a coupling strap or bar 19, or other means may extend therefrom for attachment to the drawbar of the implement, as desired.

A suitable support stand FIG. 7, indicated as a whole by the numeral 20, is provided in association with the female hitch 15 to be permanently secured to the implement 2 where some support is required for the drawbar of the implement to position it in elevated relationship to the surrounding area. Such stand 20 is needed on some implements so that the female hitch 15 will be positioned at an elevation as to facilitate engagement between the male hitch 3 and the hook 12 thereon with the female hitch for the automatic coupling action desired. Such support stand 20 is retractable when the tractor and implement are coupled together and the support then can be pulled out of the way manually by the operator of the tractor, all as described hereinafter in more detail.

It will be realized that the upwardly converging sides 16 and 17 have the same, or substantially the same angle of convergence as the corresponding side portions 7 and 8 in the male hitch so that the sides 16 and 17 form bearing surfaces that are adapted to overlap and engage the corresponding bearing surfaces formed by the side portions in the male hitch. Hence load can readily be transferred between the male and female hitch members.

In the use of the power take-off coupling means of the invention, an automatic hook-up action between the implement and tractor is effected by lowering the top of the male hitch relative to the female hitch, either by lowering the entire male hitch, or by tilting it backwards, and then backing the tractor so as to insert the converging sides of the male member and the protruding hook 12 provided thereon between the corresponding converging sides 16 and 17 and apex of the female hitch. Next raising the male hitch member, either by a lifting action, or by returning the male hitch member from its tilted to its vertical position brings the load transmitting surfaces of the two hitches into engagement and an automatic centering action of the male member inside the female hitch is effected by the hook 12 engaging the saddle-like apex of the female hitch.

The two hitch members preferably are locked together in operative engagement, as by means of a pair of locking dogs 21 and 22 which are pivotally secured to the plates 5a extending therefrom on the laterally inner surfaces of the lower portion of the male hitch 3. These locking dogs are adapted to engage pins, or equivalent members 23 provided on and extending laterally inwardly of the lower, vertically extending portions of the converging sides 16 and 17 of the female hitch 15. The action of the locking dogs 21 and 22 is controlled by a handle or control 24 that is secured to a control shaft 25 suitably journalled on and extending between the side portions 7 and 8 adjacent from but spaced vertically below the apex formed therebetween. The handle 24 is positioned to be conveniently engaged by the operator of the tractor 1 and it can be swung forwardly to move the locking dogs 21 and 22 to a release position, or be moved vertically upwardly to the position shown in FIG. 7 for effecting a locking action. The actual locking action is provided by control levers 26, 26 secured to the shaft 25 and engaging control links 27 which in turn are pivotally and individually secured to one of the locking dogs 21 and 22. The levers 26 are provided at opposite end portions of the shaft 25 for engaging the individual control links 27. Hence, the tractor and implement will be effectively coupled together for control of the implement by the tractor to move it in any desired direction.

*Power Take-Off or Coupling*

The power take-off or coupling of the invention is indicated as a whole by the numeral 30. Such power take-off includes a driving shaft, or driving member 31 that connects through a telescopically assembled shaft means 32, having universal joints 33 at its ends, to the conventional power take-off, or power supply shaft 31a provided on the tractor 1. Such driving shaft or member 31 is suitably journalled in fixed relationship to the male hitch 3 by being received in a member, such as a positioning sleeve 34, which is fixedly secured, as by welding, to the cross plate 11 and extends therefrom preferably towards the tractor 1. Such positioning sleeve 34 receives a member such as a conventional bronze bearing 35 therein that is stationarily secured to the positioning sleeve 34 in a desired manner. These sleeves, and particularly the stationary bearing 35 may be of any suitable length and normally will be at least about four to seven inches long in the general axial direction of the hitch or coupling to be effected between the tractor 1 and the implement 2. Another bearing sleeve 36, usually made from a hard metal, such as steel, is journalled in the bearing 35 and extends axially therefrom at least in the direction towards the implement 2. Upon movement of the male hitch 3 with relation to the tractor, the telescopically assembled shaft means 32 will absorb the relative movement in the power take-off unit, and the bearing 36 is retained against axial movement in the bearing 35. The bearing 36 rotates as it is fixedly secured to the driving shaft or member 31, for example, by means of an end plate 36a received within the rotatable bearing 36 and fixedly extending between the member 31 and the bearing 36.

A thrust bearing plate 37 and a driving plate 38, which is provided with a plurality of generally radially extending, equally circumferentially spaced driving lugs 39 thereon, are also present in the driving assembly. These driving teeth, or lugs 39 are formed integrally with the driving plate 38, as by cutting small, radially extending slots in such driving plate and then forcing, punching, or striking the driving lugs 39 therefrom so that the driving lugs extend rearwardly from the normal plane of the driving plate 38. Naturally these driving lugs 39 extend towards the implement 2 for engagement with a driven power take off, or coupling member, as hereinafter described. Usually the thrust bearing plate 37, and the driving plate 38 are secured to each other and to the driving shaft or member 31 by means, such as a plurality of stove bolts 40 that extend through suitable holes in these members for securing the assembly together in the manner indicated in FIG. 8 and with the bolt heads being flush with the surface of the driving plate.

FIGS. 6 and 8 of the drawings show that the end of the rotatable bearing 36 adjacent the implement 2 had a plurality of relatively wide axially extending slots 41 formed in equally spaced circumferential portions thereof and which slots terminate forwardly of the thrust bearing plate 37. Arcuate slots 42, positioned complementary to the slots 41, are provided in the plate 37. This thrust bearing plate 37 hence is adapted to have fingers 41a formed on the rotatable bearing 36 by the slots 41 stabbed through the slots 42 of the thrust bearing plate 37 whereby such thrust bearing plate can and does extend radially beyond the rotatable bearing 36 to be received between positioning, or thrust bearing rings 43 and 44. The thrust bearing rings are secured to the face of the cross plate 11 adjacent the implement 2. Such thrust bearing rings 43 and 44 can be held in spaced relationship to each other in any desired manner, as by use of a spacer ring 45 engaging the radially outer portions of the bearing rings and with any suitable members, such as bolts 46, extending through the assembly of the thrust bearing rings and spacer ring to secure them to the cross plate. Hence the radially outer portion of the thrust bearing plate 37 is freely received between these thrust bearing rings but is adapted to engage therewith over substantially the entire circumferential area of the thrust bearing plate for effective bearing engagement therewith whereby excessive axial movement of the driving assembly in the power take-off or coupling means of the invention is prevented.

The female power take-off, FIGS. 2, 3, 4 and 8, is indicated as a whole by the numeral 50 and it includes a driven stub shaft 51 which is journalled in a relatively fixed position with relation to the female hitch 15. The stub shaft 51 has a plurality of splines 52 provided on the end thereof extending towards the implement 2 to engage a splined socket 53 which may be connected in any conventional manner, as by a telescopic shaft 54 to the shaft or other power receiving means on the implement for transmitting drive or power thereto.

Figure 9:
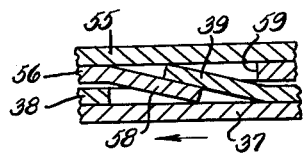
FIG. 9 is a fragmentary section through the driving and driven members in the power take-off.

The stub shaft 51 at its forward end is secured, as by welding, to an attachment plate 55. A further connector or driven plate 56 is provided in this embodiment of the invention on the front face of the plate 55, and it in turn is secured, as by welding, to a rotatable steel bearing, or sleeve 57. The male power take-off 50, as part of the driven shaft assembly therein, also includes a plurality of driving lugs 58 formed on the driven plate 56 and shaped the same and positioned complementary to the driving lugs 39 on the driving plate as shown in FIG. 9. Hence, when the driving plate 38 and the driven plate 56 are brought into axial alignment with each other and moved into substantially abutting relationship, drive or power then can be readily transmitted from the driving plate to the driven plate by inter-engagement of the lugs 39 and 58. FIG. 9 also shows that slots 59 formed adjacent each of the lugs 58 provide space in the driven plate 58 for receiving the lugs 39, and the corresponding slots in the driving plate receive the lugs 58.

Any suitable members, such as stove bolts 60, may extend through the attachment plate 55, and the driven plate 56 for retaining these members in desired unitary assembled relationship.

The actual positioning of the bearing 57 is provided by means of a stationary bearing sleeve 61 formed from conventional material such as brass or bronze, and with such stationary bearing 61 normally being secured or welded to a positioning sleeve 62. The positioning sleeve 62 is in turn welded, or otherwise permanently attached to a positioning plate or cross plate 63 that is resiliently attached to the female hitch 15, as hereinafter described. Axial movement of the driven plate 56 rearwardly of the assembly is prevented by the plate contacting the front edge of the bearing sleeve 61 while a keeper ring 64 is seated in an annular recess on the rear end portion of the sleeve 57 to engage the rear end of the bearing sleeve 61 to prevent forward movement of the driven shaft 51 and means connected thereto.

The resilient positioning of the cross plate 63 and hence of the driven assembly in the power coupling is provided by the means connecting the cross plate to the female hitch 15. Such means, in the currently preferred embodiment of the invention, include a pair of brackets 65 one of which is secured, as by bolts 66, to the laterally outer surface of each of the sides 16 and 17. Each bracket 65 has an overhanging flange 67 formed thereon and extending rearwardly of the hitch. The cross plate 63 is slotted adjacent its lateral margins to permit the overhanging flanges 67 to extend therethrough but to form stops for providing limited rearward sliding movement of the cross plate on such flanges 67. Forward movement of the cross plate 63 is limited by its engagement with the rear edges of the sides 16 and 17 of the female hitch. Springs 68 extend between lugs 69 on the brackets 65 and the cross plate 63 to urge such plate to seat, normally, against the sides 16 and 17.

Thus when the driving plate 38 is moved up against the driven plate 56 as the male and female hitch means are engaged, the driven assembly in the power coupling can tilt slightly in any direction because of "slop" between the slots in the cross plate 63 and the flanges 67, and the driven assembly can move backwards on the female hitch until stopped by the overhanging flanges 67. By starting to drive the power take off shaft 31a on the tractor, the lugs 39 and 58 will engage as the springs 68 are urging the cross plate 63 forwardly.

Another feature of the power coupling is that the driven assembly can over run the driving assembly when the drive of the shaft 31a is stopped. Such over running action will automatically occur in the apparatus of the invention and the lugs 58 would ride up onto the driving plate 38 and slide over the rear faces of the lugs 39. Such slippage in the driving connection naturally intermittently forces, or jumps the cross plate 63 and entire driven assembly rearwardly slightly until rotation of the driven shaft 51 stops.

*Support Stand*

The support stand 20 for the implement 2 is shown in FIG. 7 but is omitted in the other drawings for clarity. Such stand includes a foot 70 rigidly secured to and extending forwardly from a pair of supports 71 extending upwardly and forwardly of the implement in laterally spaced relation. The supports 71 are slidably received in individual tubes 72 fixedly and suitably secured to the draw bar attachment or strap 19 and the rear, upper portion of the female hitch 15. A control rod 73 is secured to the foot 70 and extends along parallel to one of the tubes 72 but projects appreciably upwardly and forwardly therefrom. A handle 74 is formed on the upper end of the control rod 73 and is accessible to the tractor operator when on the tractor seat. The vertical position of the stand 20 is controlled by collars 75 and 76 secured to vertically spaced portions of the control rod for engaging a support bracket 77 on the adjacent tube 72. The collar 76 when on the bracket 77 holds the stand inoperatively, while the collar 75 is placed below the bracket 77 to engage it for positioning the stand operatively. The change in position of the stand 20 will normally be accomplished when the implement and tractor are hitched together and with the stand 20 being lifted above the ground.

It will be seen that the tractor and implement hitch means in association with which the power take-off or coupling of the invention is used preferably provides the tractor mounted hitch as the male hitch member, and the female hitch element is positioned on the implement. While these hitch members and the specific means connecting the power coupling members thereto may be of various constructions, in different types of hitches and in the hitch shown, it is desirable that some type of a projecting hook be provided on the male hitch for engaging the female hitch to bring an automatic aligning, seating and/or saddling action of the female hitch and implement means onto the male hitch means. The automatic aligning action also results in simultaneous automatic engagement of the power coupling members. It will be seen that a seat is normally provided on the male hitch to receive the female hitch for load transfer action. The preferred embodiment of the invention utilizes a female power coupling member or assembly positioned in a fixed manner on the male hitch, and the male power coupling, or assembly is resiliently associated with the female hitch. It will be seen that the coupling actions are obtained without the operator of the tractor dismounting from the vehicle.

It will be realized in some instances that both the male hitch member and the male power coupling member could be positioned on the tractor hitch, if desired, but by the present construction it is believed that a more compact power coupling is formed.

From the foregoing, it is believed that a novel and improved automatic type power take-off or coupling means has been provided for use on vehicles such as tractors for power supply to members such as a tractor or farm implement to be attached to and used in association with a tractor, or to be pulled or drawn thereby. At most, some slight jockeying of the tractor with relation to the implement may be necessary to aid in engaging the power receiving means on the implement with the power supply means on the tractor, but normally all that is required to effect the power coupling between the tractor and implement, is to start to drive the drive member of the power coupling after the hitch means have been locked in assembled relationship with each other, and the power coupling action then is automatically and easily effected.

In some instances, it may be desired to provide the female power coupling member with more of an outwardly flaring bell-shaped mouth to facilitate engagement of the male coupling member therewith.

The apparatus of the invention preferably also includes guide means, such as a guide bar 80, to facilitate automatic engagement of the power coupling members. The guide bar 80 is secured to the cross plate 11 on the male hitch and it extends upwardly and then downwardly and rearwardly in the drive assembly. The guide bar 80 terminates immediately adjacent and above one of the fingers 41a provided on the bearing sleeve 41 whereby, as the male hitch 3 is lowered, or tilted to engage the female hitch and then raised up for the automatic aligning and hitching action, the guide bar 80 may engage the driven plate 56 or other portions of the driven assembly to force it rearwardly. When the male hitch is raised sufficiently, the guide bar 80 is moved up out of engagement with the driven assembly. The springs 68 will then pull the driven assembly forwardly to telescope the sleeve 61 into the end of the bearing sleeve 36.

If desired, vertically extending guides (not shown) may be provided on the tractor to engage the arms 5, 5 and prevent lateral movement thereof.

The terms "rear," "front," "forwardly," etc. in the specification are used with relation to the tractor and whether the element extends or faces towards or away from the tractor.

In view of the foregoing, it is believed that the objects and advantages of the invention have been secured.

In accord with the patent statutes, one currently preferred embodiment of the invention has been disclosed and completely described herein. However, the scope of the invention is defined in the claims and it should be understood that modification may be made of the apparatus shown without departing from the principles of the invention.

What is claimed is:

1. In a power coupling assembly for a tractor having power supply means for lifting and lowering a hitch member attached thereto or for tilting such member in a fore and aft direction,
a power supply shaft on the tractor, and
an implement having a hitch member thereon, the combination of:
a driving shaft adapted to be connected to said power supply shaft,
means journaling said driving shaft in a fixed position on and relative to said hitch member,
a driven shaft adapted to be coupled to means on said implement for power supply thereto,
means on said implement hitch member engaging and journalling said driven shaft therein,
resilient means connecting said last-named means to said hitch member for limited movement relative thereto,
interengaging means operatively carried by said driving shaft and by said driven shaft for power transmission therebetween,
said interengaging means being substantially simultaneously engaged when said hitch members on the tractor and implement are engaged by relative movement therebetween, and
guide means on said tractor hitch member above said driving shaft to guide said driven shaft to proper engaging position when said tractor hitch is below said implement hitch and said tractor hitch is raised up for nesting engagement between said hitch members.

2. In a power coupling assembly for a tractor having power supply means for lifting and lowering a hitch member attached thereto or for tilting such member in a fore and aft direction,
a power supply shaft on the tractor, and
an implement having a hitch member thereon, the combination of:
a driving shaft adapted to be connected to said power supply shaft,
means journalling said driving shaft in a fixed position on and relative to said hitch member,
a driven shaft adapted to be coupled to means on said implement for power supply thereto,
means on said implement hitch member engaging and journalling said driven shaft therein,
interengaging means operatively carried by said driven shaft and by said driven shaft for power transmission therebetween,
said interengaging means being substantially simultaneously engaged when said hitch members on the tractor and implement are engaged by relative movement therebetween, and
guide means to guide said driven shaft to proper position with relation to said driving shaft when said said tractor hitch is below said implement hitch and said tractor hitch is raised up for nesting engagement between said hitch members.

3. In a tractor and implement combination including a male hitch member on said tractor and a female hitch member on said implement for engaging said male hitch member on generally axial movement therebetween, and
a driven power supply shaft on said tractor journalled in a fixed position relative to said male hitch member, the combination including:
a driving shaft adapted to be connected to said power supply shaft,
means journalling said driving shaft in a fixed position on and relative to said male hitch member,
a driving plate with lugs thereon extending generally rearwardly and axially therefrom operatively connected to and carried by said driving shaft,
a driven shaft adapted to be coupled to means on said implement for power supply thereto,
means on said female hitch member engaging and journalling said driven shaft therein,
resilient means connecting said last-named means to said female hitch member for limited movement relative thereto, and
a driven plate with lugs thereon operatively connected to and carried by said driven shaft, said driven plate lugs being adapted to engage said driving plate lugs for power transmission therebetween when said hitch members are engaged.

4. In a tractor and implement combination,
a male hitch member attached to the tractor,
power means for lifting and lowering said hitch member and for tilting it in a fore and aft direction,
a power supply shaft on the tractor,
a female hitch member on the implement for receiving said male hitch member for load transfer and support action therebetween,
a driving member carried by said tractor hitch member and operatively engaging said power supply shaft,
a driven member carried by said implement hitch member,
interengaging means operatively carried by said driving member and by said driven member for power transmission therebetween and engageable by relative axial movement therebetween,
said interengaging means being substantially simultaneously engaged when said hitch members on the tractor and implement are engaged by relative movement therebetween,
and means securing said driven member to said implement hitch member for limited movement of said driven member with relation to said implement hitch member to facilitate engagement of said interengaging means.

5. In a power coupling assembly for a tractor having a hitch member attached thereto,
a power supply shaft on the tractor, and
an implement having a hitch member thereon,
said hitch members being automatically engageable with each other by relative axial and lifting movement between the hitch members, the combination of,
a driving member carried by said tractor hitch member and connected to said power supply shaft,
a driven member carried by said implement hitch member,
interengaging means operatively carried by said driving member and by said driven member for power transmission therebetween and engageable by relative axial movement therebetween,
said interengaging means being substantially simultaneously engaged when said hitch members on the tractor and implement are engaged by relative movement therebetween,
and means securing said driven member to said implement hitch member for limited movement of said driven member with relation to said implement hitch member to facilitate engagement of said interengaging means.

6. In a power coupling assembly for a tractor having a hitch member attached thereto,
a power supply shaft on the tractor, and
an implement having a hitch member thereon,
said hitch member being automatically engageable with each other by relative axial and lifting movement between the hitch members the combination of;

a driving member carried by said tractor hitch member and engageable with said power supply shaft, a thrust bearing plate operatively secured to said driving member to prevent axial movement thereof;

a driven member carried by said implement hitch member, interengaging means operatively carried by said driving member and by said driven member for power transmission therebetween and for engagement by the relative movement therebetween required to engage said hitch members, said driving member providing a sleeve into which said driven member projects for engagement therebetween, and guide means associated with said tractor hitch member to facilitate alignment and engagement of said interengaging means.

7. In a power coupling for use with a tractor having a hitch member attached thereto, a power supply shaft on the tractor, and an implement having a hitch member thereon, the combination of:

a driving member carried by said tractor hitch member and engageable with said power supply shaft, a driven member carried by said implement hitch member, interengaging means operatively carried by said driving member and by said driven member for power transmission therebetween and for engagement by relative movement therebetween, and resilient means operatively associated with said implement hitch member to secure said driven member thereto for relative movement including axial movement of said driven member with relation to said implement hitch.

8. In a power coupling for use with a vehicle having a hitch member attached thereto, a power supply shaft on the vehicle, and an implement having a hitch member thereon, the combination of:

a driving member carried by said vehicle hitch member and engageable with said power supply shaft, a driven member carried by said implement hitch member, and inter-engaging coupling means operatively carried by said driving member and by said driven member for power transmission and for engagement by relative axial movement therebetween, said hitch members being engageable to connect the tractor and implement together, which action also brings said driving and driven members into associated positions for automatic engagement of said inter-engaging means.

9. A combination as in claim 3 where, slots are provided adjacent each of said lugs on said driving plate and said driven plate to receive the lugs on the other of said plates.

10. A combination as in claim 3 where, said lugs on said driving plate and said driven plate extend radially of said plates but with said lugs on different plates being inclined laterally for engagement therebetween, said lugs on said driven plate being adapted to slide over the said lugs on said driving plate when said driving shaft has been rotating and is rapidly decelerated, said resilient means permitting rearward movement of said driven shaft and driven plate when said driven shaft overruns said drive shaft.

11. In a tractor and implement combination, a male hitch member attached to the tractor, power means for lifting and lowering said hitch member, a power supply member and a female coupling means journalled on the tractor in fixed relation to said male hitch member, a female hitch member on the implement for receiving said male hitch member for load transfer and support action therebetween, a male coupling means carried by said female hitch member, and means resiliently securing at least one of said coupling means to its hitch member for limited movement with relation thereto to facilitate engagement of said coupling.

said hitch members being first engageable to obtain at least substantial alignment of said coupling means and automatic engagement thereof substantially concurrently with full engagement of said hitch members.

12. In a tractor and implement combination, a male hitch member attached to the tractor, a power take-off shaft on the tractor, power means for lifting and lowering said hitch member and for tilting it in a fore and aft direction, a female coupling means secured to the rear end of the power take-off shaft and journalled on the male hitch member but held against movement along its axis, a female hitch member on the implement for receiving said male hitch member for load transfer and support action therebetween, a driven shaft on the implement, and a male coupling means on the front end of the driven shaft and rotatably carried by said female hitch member, said hitch members being first engageable to obtain at least substantial alignment of said coupling means and driving engagement thereof substantially concurrently with full engagement of said hitch members.

13. In a power coupling assembly for a tractor having a hitch member attached thereto, a power supply shaft on the tractor, and an implement having a hitch member thereon, said hitch members being automatically engageable with each other by relative movement between the hitch members, the combination of:

a driving member rotatably carried by said tractor hitch member and connected to said power supply shaft, a driven member rotatably carried by said implement hitch member, and interengaging coupling means operatively carried by said driving member and by said driven member for power transmission therebetween and engageable by relative axial movement therebetween, said interengaging coupling means being positioned in axial alignment and being automatically engaged after said hitch members on the tractor and implement are engaged by relative movement therebetween.

14. In a power coupling assembly for a tractor having a hitch member attached thereto, a power supply shaft on the tractor, and an implement having a hitch member thereon, said hitch members being automatically engageable with each other by relative movement between the hitch members, the combination of:

a driving member rotatably carried by said tractor hitch member and connected to said power supply shaft, a driven member rotatably carried by said implement hitch member, interengaging coupling means operatively carried by said driving member and by said driven member and engageable by relative axial movement for power transmission therebetween, said interengaging means being substantially simultaneously automatically engaged when said hitch members on the tractor and implement are engaged by relative movement therebetween, and thrust bearing means securing said driving member to said tractor hitch member to prevent axial movement of said driving member.

15. A combination as in claim 12 where said male hitch member includes converging support plates that are flat surfaced in a fore to aft direction, and said female hitch member has surfaces provided therein complementary to said support plates, said male and female coupling means having a relatively short axial overlap provided therebetween when operatively engaged to facilitate engagement thereof.

16. In a power coupling for use with a vehicle having a hitch member attached thereto, a power supply shaft on the vehicle, and an implement having a hitch member thereon, the combination of:

a driving member carried by said vehicle hitch member and engageable with said power supply shaft, a driven member carried by said implement hitch member, interengaging plate-type coupling means operatively carried by said driving member and by said driven member for power transmission and for engagement by relative axial movement therebetween, and resilient means operatively connecting to one of said coupling means to aid in positioning it but to permit limited movement thereof with relation to the other of said coupling means, said hitch members being engageable to connect the tractor and implement together, which action also brings said driving and driven members into associated positions for automatic engagement of said inter-engaging means.

References Cited in the file of this patent

UNITED STATES PATENTS

| | | |
|---|---|---|
| 2,869,660 | Miller et al. | Jan. 20, 1959 |
| 2,979,137 | Hess | Apr. 11, 1961 |

FOREIGN PATENTS

| | | |
|---|---|---|
| 956,460 | Germany | Feb. 14, 1957 |